United States Patent
Helmer et al.

(10) Patent No.: US 10,053,240 B1
(45) Date of Patent: Aug. 21, 2018

(54) STOWAGE, DEPLOYMENT AND POSITIONING OF RIGID ANTENNA REFLECTORS ON A SPACECRAFT

(71) Applicant: Space Systems/Loral, LLC, Palo Alto, CA (US)

(72) Inventors: Robert Edward Helmer, Pleasanton, CA (US); William G. Hart, III, Mountain View, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 148 days.

(21) Appl. No.: 15/160,258

(22) Filed: May 20, 2016

(51) Int. Cl.
  *B64G 1/22* (2006.01)
  *H01Q 1/12* (2006.01)
  *H01Q 1/28* (2006.01)
  *B64G 1/10* (2006.01)

(52) U.S. Cl.
  CPC ............ *B64G 1/222* (2013.01); *B64G 1/1007* (2013.01); *H01Q 1/1235* (2013.01); *H01Q 1/288* (2013.01)

(58) Field of Classification Search
  CPC ........ B64G 1/222; B64G 1/66; H01Q 1/1235; H01Q 1/288; H01Q 15/161
  See application file for complete search history.

(56) References Cited

U.S. PATENT DOCUMENTS

| | | |
|---|---|---|
| 4,550,319 A | 10/1985 | Ganssle et al. |
| 4,634,086 A | 1/1987 | Mori |
| 5,644,322 A | 7/1997 | Hayes et al. |
| 5,963,182 A * | 10/1999 | Bassily ................ H01Q 15/161 343/881 |
| 5,969,695 A * | 10/1999 | Bassily .................... H01Q 1/08 343/912 |
| 6,124,835 A | 9/2000 | Nguyen et al. |

(Continued)

FOREIGN PATENT DOCUMENTS

WO WO 2012/036863 A1 3/2012

OTHER PUBLICATIONS

Taylor et al., "Large Aperture, Solid Surface Deployable Reflector," Composite Technology Development (CTD), 2600 Campus Dr., Lafayette, CO 80027, Earth Science Technology Office, Advanced Component Technology (ACT) Program, contract #NNX09AD57G, 6 pp.

*Primary Examiner* — Joseph W Sanderson
(74) *Attorney, Agent, or Firm* — Weaver Austin Villeneuve & Sampson LLP

(57) ABSTRACT

A spacecraft includes an aft surface, a forward surface and a main body structure disposed therebetween, a stowage and deployment arrangement (SDA) joined to the main body structure by a first mechanical coupling, and an antenna that includes a respective feed element and a rigid antenna reflector coupled with the main body by way of the SDA. The feed element is joined to the main body structure by a second, different, mechanical coupling. The spacecraft is reconfigurable from a launch configuration, with the reflector is disposed forward of the forward surface, with its aperture plane substantially parallel to the forward surface, to an on-orbit configuration. The SDA repositions the reflector to a second position corresponding to the on-orbit configuration. In the second position, the reflector is disposed, Earth facing, substantially aft of the forward surface and outboard of the main body structure and is illuminated by the respective feed element.

20 Claims, 6 Drawing Sheets

(56) References Cited

U.S. PATENT DOCUMENTS

| | | | | |
|---|---|---|---|---|
| 6,308,919 B1 * | 10/2001 | Palmer | ............... | B64G 1/222 |
| | | | | 244/172.6 |
| 6,448,940 B1 | 9/2002 | Chiang | | |
| 7,714,797 B2 | 5/2010 | Couchman et al. | | |
| 8,448,902 B2 | 5/2013 | Gelon et al. | | |
| 8,487,830 B2 * | 7/2013 | Texier | ............... | H01Q 1/288 |
| | | | | 343/881 |
| 8,550,407 B2 * | 10/2013 | Vezain | ............... | B64G 1/66 |
| | | | | 136/245 |
| 8,789,796 B2 | 7/2014 | Boccio et al. | | |
| 9,013,577 B2 | 4/2015 | Miranda et al. | | |
| 2016/0264264 A1 * | 9/2016 | Helmer | ............... | B64G 1/222 |

* cited by examiner

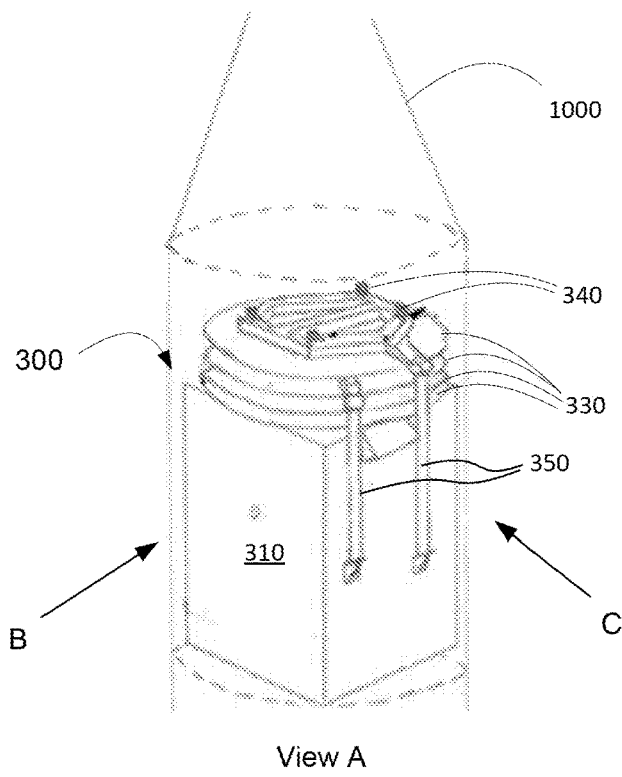
View A
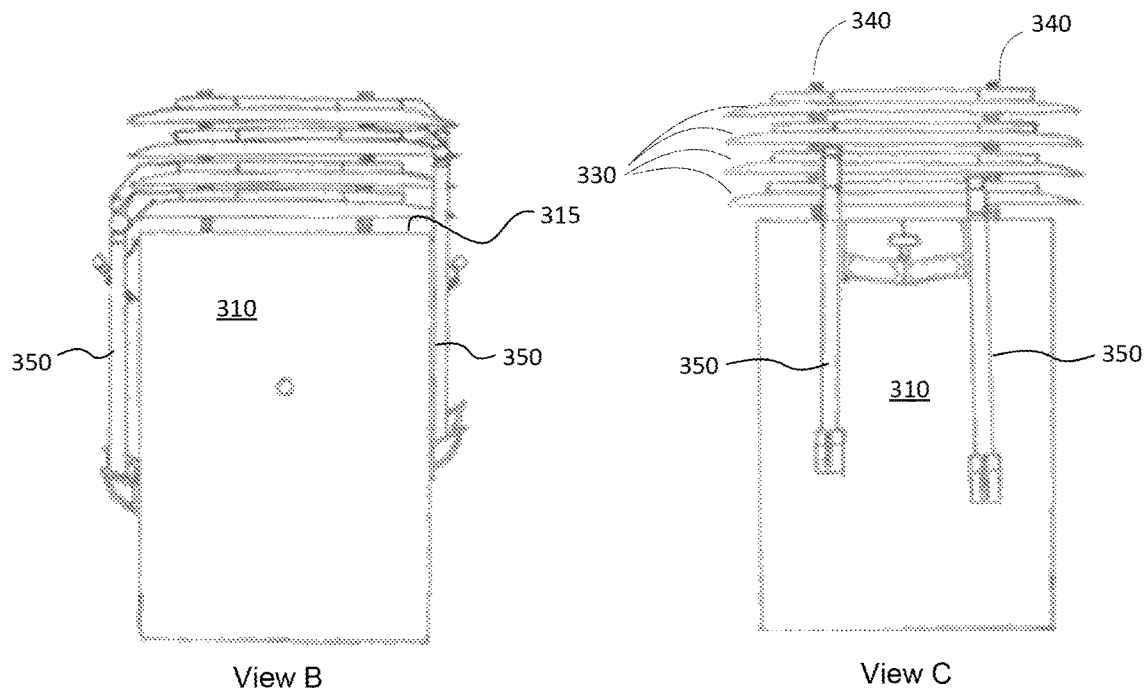
View B
View C
Figure 3

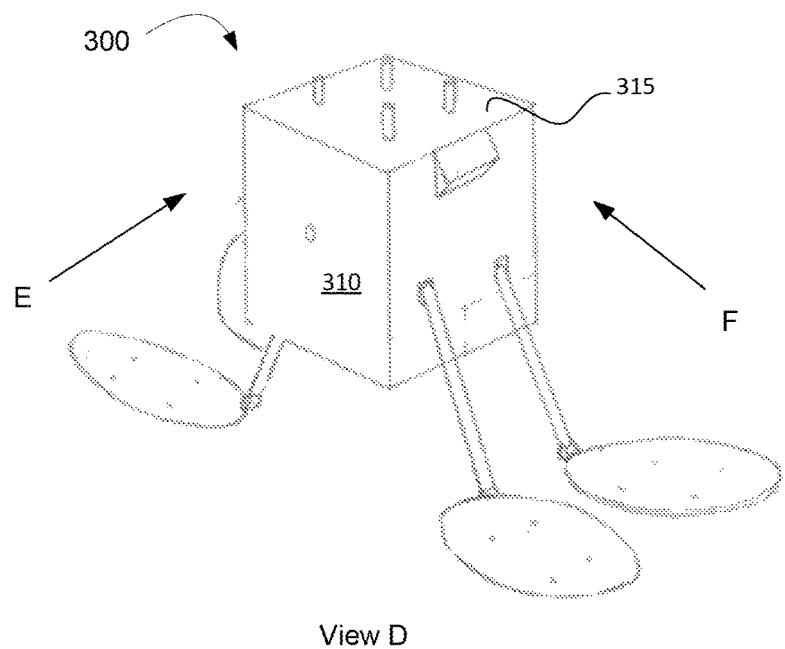
View D
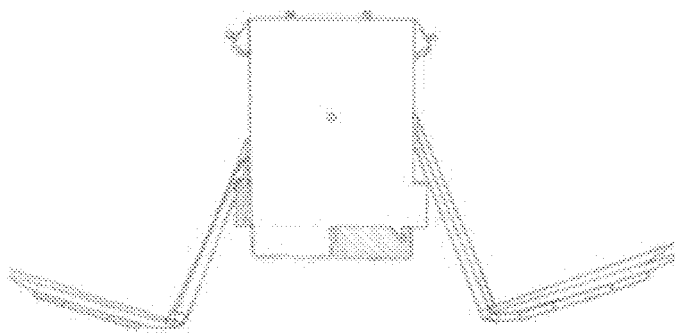
View E
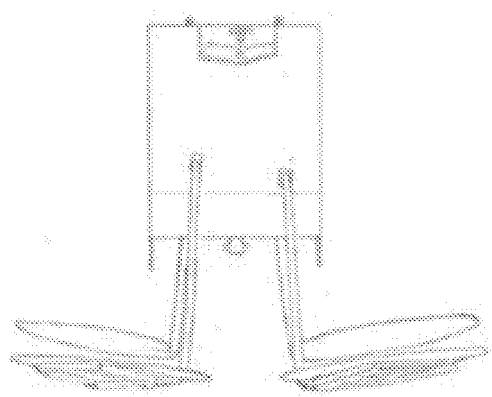
View F
Figure 4

STOWAGE, DEPLOYMENT AND POSITIONING OF RIGID ANTENNA REFLECTORS ON A SPACECRAFT

TECHNICAL FIELD

This invention relates generally to communications satellites, and more particularly to improved techniques for reconfiguring a satellite from a launch configuration to an on-orbit configuration.

BACKGROUND

The assignee of the present invention manufactures and deploys spacecraft for, inter alia, communications and broadcast services. Market demands for such spacecraft have imposed increasingly stringent requirements on spacecraft payload capacity. To meet these demands, spacecraft with an increased quantity of antenna reflectors and/or with reflectors having an increased aperture size are desirable.

Launch vehicle compatibility is a second requirement faced by a spacecraft designer. The increased performance requirements are only advantageously met if compatibility with conventional, commercially available launch vehicles is maintained. Accordingly, a spacecraft, as configured for launch, is desirably made compatible with fairing envelope constraints of such launch vehicles as, for example, Ariane V, Atlas XEPF, Proton, Falcon 9, and Sea Launch. As a result, it is very often a requirement to reconfigure a spacecraft from a launch configuration to an on-orbit configuration by repositioning an antenna reflector from a stowed (launch) position to a deployed (on-orbit) position. Some techniques related to this requirement are disclosed in U.S. Pat. Nos. 5,644,322, 6,448,940, 8,789,796 and 8,448,902, assigned to the assignee of the present disclosure, and in U.S. patent application Ser. No. 14/642,486, assigned to the assignee of the present disclosure, the disclosures of which are hereby incorporated by reference into the present disclosure in their entirety for all purposes.

Improved techniques for accommodating larger and more numerous antenna reflectors are desirable.

SUMMARY

According to some implementations, a spacecraft includes a structural interface adapter for mating to a launch vehicle, an aft surface disposed proximate to the structural interface adapter, a forward surface disposed opposite to the aft surface, a main body structure disposed between the aft surface and the forward surface, a stowage and deployment arrangement joined to the main body structure by a first mechanical coupling and at least one antenna. The least one antenna includes a rigid antenna reflector and a respective feed element, the reflector having an aperture plane, the rigid antenna reflector being coupled with the main body structure by way of the stowage and deployment arrangement, the feed element being joined to the main body structure by a second mechanical coupling, different from the first mechanical coupling. The spacecraft is reconfigurable from a launch configuration to an on-orbit configuration, where, in the launch configuration, the antenna reflector is disposed in a first position, undeployed, forward of the forward surface, with the aperture plane substantially parallel to the forward surface, the stowage and deployment arrangement repositions the antenna reflector from the first position to a second position corresponding to the on-orbit configuration, and, in the second position, the antenna reflector is disposed, deployed, so as to be illuminated by the respective feed element and Earth facing from a position substantially aft of the forward surface and outboard of the main body structure.

In some examples, the stowage and deployment arrangement may include a proximal portion proximate to the first mechanical coupling and a distal portion proximate to a third mechanical coupling between the stowage and deployment arrangement and the rigid antenna reflector. In some examples, the first mechanical coupling may include a hinge. In some examples, the third mechanical coupling may be near the center of the antenna reflector. In some examples, the third mechanical coupling may include one or more of a hinged joint, an actuator, a two axis positioning mechanism, and a three axis positioning mechanism.

In some examples, the spacecraft, in the on-orbit configuration may be three axis stabilized. In some examples, a centroid of the aperture plane may be substantially aligned with a launch vehicle longitudinal axis. In some examples, the antenna reflector, in the launch configuration, may be mechanically attached with the spacecraft main body structure by way of a fourth mechanical coupling. In some examples, the fourth mechanical coupling may be a launch holddown device.

In some examples, the first mechanical coupling may include one or more of a spacecraft structural element, a hinged joint, an actuator, a two axis positioning mechanism, and a three axis positioning mechanism.

According to some implementations, a method includes reconfiguring a spacecraft from a launch configuration to an on-orbit configuration. The spacecraft includes a structural interface adapter for mating to a launch vehicle, an aft surface disposed proximate to the structural interface adapter, a forward surface disposed opposite to the aft surface, a main body structure disposed between the aft surface and the forward surface, a stowage and deployment arrangement joined to the main body structure by a first mechanical coupling, and at least one antenna, including a rigid antenna reflector and a respective feed element, the rigid antenna reflector having an aperture plane, the rigid antenna reflector being coupled with the main body structure by way of the stowage and deployment arrangement, the feed element being joined to the main body structure by a second mechanical coupling, different from the first mechanical coupling. In the launch configuration, the antenna reflector is disposed in a first position, undeployed, forward of the forward surface, with the aperture plane substantially parallel to the forward surface. Reconfiguring includes repositioning, with the stowage and deployment arrangement, the antenna reflector from the first position to a second position corresponding to the on-orbit configuration, illuminating the antenna reflector with the respective feed element, the antenna reflector being disposed, deployed, in the second position so as to be Earth facing from a position substantially aft of the forward surface and outboard of the main body structure.

BRIEF DESCRIPTION OF THE DRAWINGS

Features of the invention are more fully disclosed in the following detailed description of the preferred embodiments, reference being had to the accompanying drawings, in which like reference numerals designate like structural element, and in which:

FIG. 3 illustrates a spacecraft in a launch configuration, according to an implementation.

FIG. 4 illustrates a spacecraft in an on orbit configuration, according to an implementation.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when a feature is referred to as being "connected" or "coupled" to another feature, it can be directly connected or coupled to the other feature, or intervening e feature s may be present. Furthermore, "connected" or "coupled" as used herein may include wirelessly connected or coupled. It will be understood that although the terms "first" and "second" are used herein to describe various features, these features should not be limited by these terms. These terms are used only to distinguish one feature from another feature. Thus, for example, a first user terminal could be termed a second user terminal, and similarly, a second user terminal may be termed a first user terminal without departing from the teachings of the present invention. As used herein, the term "and/or" includes any and all combinations of one or more of the associated listed items. The symbol "/" is also used as a shorthand notation for "and/or".

The terms "spacecraft", "satellite" and "vehicle" may be used interchangeably herein, and generally refer to any orbiting satellite or spacecraft system.

Figure 1:
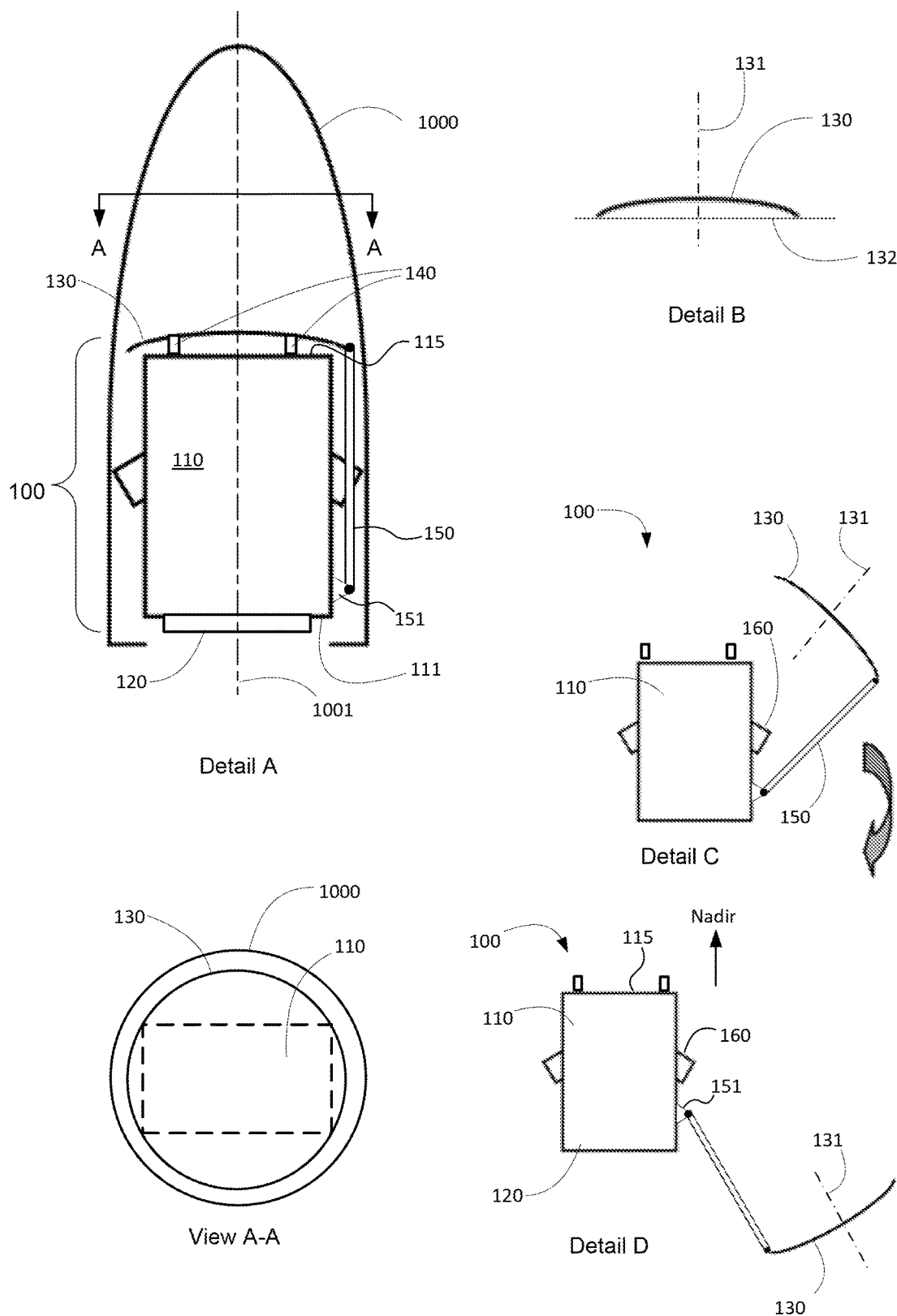
FIG. 1 illustrates an example of a spacecraft reconfigurable from a launch configuration to an on-orbit configuration in accordance with an implementation.

FIG. 1 illustrates an example of a spacecraft reconfigurable from a launch configuration to an on-orbit configuration in accordance with an implementation. Referring first to Detail A, a spacecraft 100 is depicted, as configured in a launch configuration, within a launch vehicle fairing 1000. The spacecraft 100 may include a main body structure 110 disposed between and defining an aft surface 111 and a forward surface 115 opposite thereto. The aft surface 111 may be disposed proximate to a structural interface adapter 120. The structural interface adapter 120 may be configured to mate with a launch vehicle upper stage (not illustrated). The antenna reflector 130 is disposed, in the launch configuration, forward of the forward surface 115. As depicted in detail B, the antenna reflector 130 may include a rigid, curved surface defining a bore sight 131 and an aperture plane 132 substantially orthogonal thereto.

Referring again to Detail A, antenna reflector 130 may be disposed, in the launch configuration, such that its aperture plane 132 is substantially parallel to the forward surface 115 (i.e., orthogonal to the longitudinal axis 1001 of the launch vehicle fairing 1000). As a result, as may be observed in View A-A, where reflector 130 has a substantially circular outer edge, a diameter of the reflector 130 may be nearly as large as a diameter of the launch vehicle fairing 1000.

In the launch configuration, antenna reflector 130 may be mechanically attached with the spacecraft main body 110 by way of a stowage and deployment arrangement 150 and one or more mechanical coupling arrangements 140. The stowage and deployment arrangement 150 may be configured as a structural mast or "boom" hingedly coupled with the spacecraft by a first mechanical coupling 151. Each mechanical coupling arrangement 140 may include a separable mechanical linkage between the antenna reflector 130 and the spacecraft main body 110. For example, the coupling arrangement 140 may, in the launch configuration, be configured to rigidly couple the antenna reflector 130 with the spacecraft main body 110, and be configured so as to withstand dynamic launch loads. The arrangement 140, which may be referred to as a "launch holddown device" may include a release mechanism (not illustrated). Actuation of the release mechanism may result in detaching the antenna reflector 130 from the spacecraft main body structure 110. As a result of being detached, the antenna reflector 130 may be free to be moved into the on-orbit configuration by the stowage and deployment arrangement 150 as described below.

Referring now to Detail C, a configuration is illustrated that may occur as part of a transition between the launch configuration illustrated in detail A and an on-orbit configuration illustrated in Detail D. In a "transition configuration" illustrated in Detail C, the antenna reflector 130 is depicted as being rotated substantially outboard of the spacecraft main body structure 110 toward a position consistent with the on-orbit configuration (Detail D).

Referring now to Detail D, the spacecraft 100 is illustrated in the on-orbit configuration. The spacecraft 100, in the on orbit configuration, may be three axis stabilized and may be disposed such that the forward surface 115 is nadir facing (i.e., toward the Earth). In the illustrated on-orbit condition, reflector 130 is mechanically attached with the spacecraft main body structure 110 by way of the stowage and deployment arrangement 150 in a position that is substantially aft of the aft surface 120 and outboard of the spacecraft main body structure 110. In some implementations the reflector 130, in the on-orbit condition may be disposed in a position that is substantially aft of the forward surface 115 and forward of the aft surface 111. In some implementations, the structural arrangement 150 may be a boom having an articulable connection with the spacecraft main body structure 110. For example, the stowage and deployment arrangement 150 may include one or more hinged joints in addition to hinge mechanism 151. In some implementations the stowage and deployment arrangement 150 may include an antenna positioning mechanism configured to steer antenna reflector 130.

Referring still to Detail D of FIG. 1, in the on orbit configuration the reflector 130 is illuminated by a respective feed element 160. Advantageously, the feed element 160 is mechanically coupled with the spacecraft main body structure 110 by way of a second mechanical coupling (not illustrated) that is different from the first mechanical coupling 151.

Figure 2:
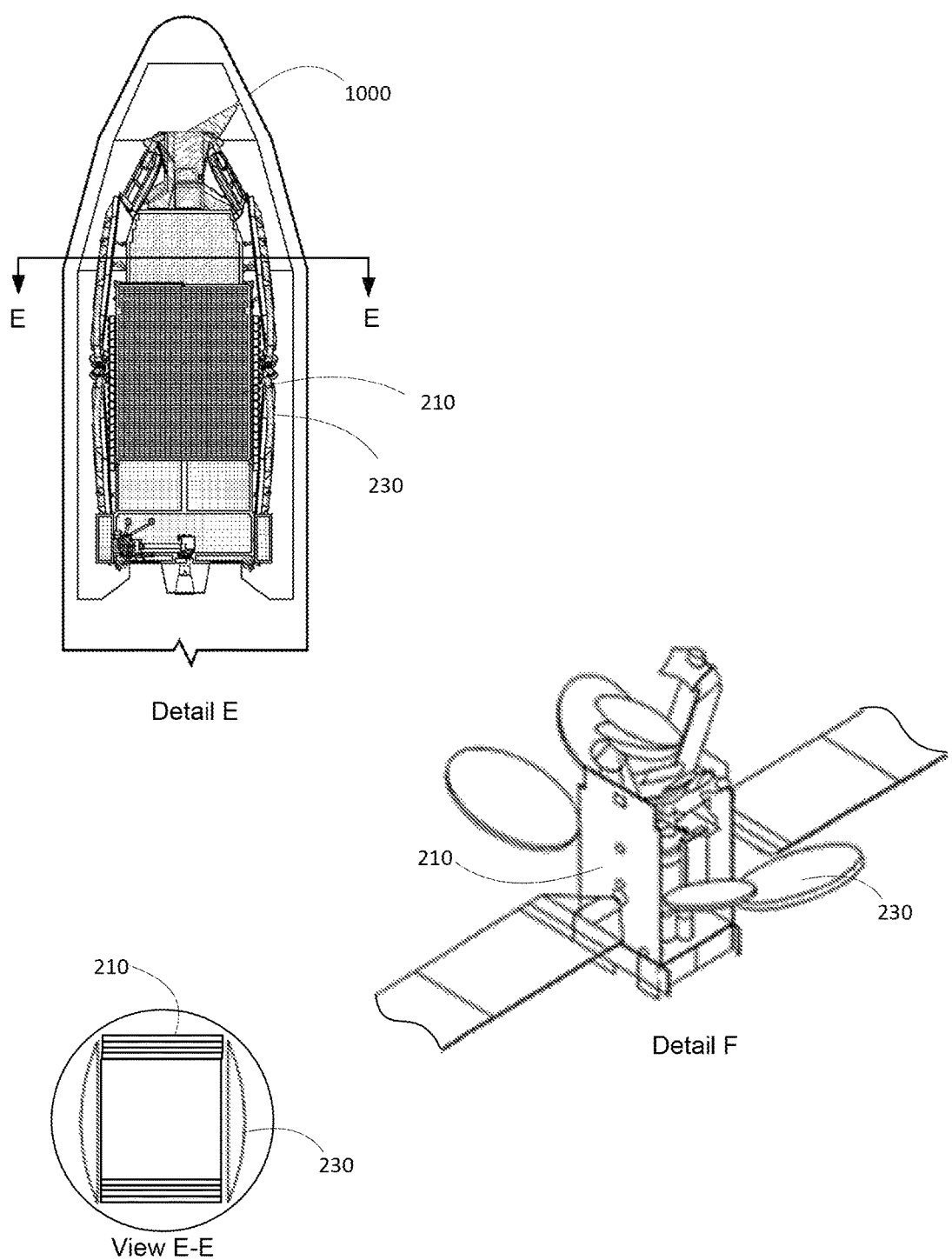
FIG. 2 illustrates an example of a spacecraft arranged in the absence of the present teachings.

Features and benefits of the presently disclosed techniques may be better appreciated by comparing the above-described configurations with a spacecraft arranged in the absence of the present teachings, as illustrated in FIG. 2. In the launch configuration illustrated in Detail E, antenna reflectors 230 are stowed against exterior walls of spacecraft main body structure 210. This may be observed in view E-E, a consequence of this arrangement is that a diameter of the antenna reflector 230 must be substantially smaller than a diameter of launch vehicle fairing 1000. Detail F shows the spacecraft in a launch configuration in which the reflectors 230 have been deployed. Conventionally, each reflector 230 may be deployed with a respective mechanism that has one or more degrees of freedom.

Put simply, the present inventors have appreciated that a size of one or more rigid antenna reflectors, and/or the number of reflectors that may be carried while still respecting launch vehicle fairing constraints may be increased in the following manner. First, by arranging the reflector(s), in the launch configuration in a stowed location above the spacecraft main body, with the aperture plane parallel to the spacecraft forward surface (i.e., orthogonal to a launch vehicle longitudinal axis) the diameter of a circular reflector may be configured to be nearly as large as the launch vehicle fairing diameter. Second, a stowage and deployment arrangement is contemplated that is configured to move the reflector(s) from the stowed location to a deployed location and has a first mechanical coupling with the spacecraft main body. In the deployed location, the reflector may be illuminated by a respective feed element that has a second mechanical coupling with the spacecraft main body structure that is separate and independent from the first mechanical coupling. Advantageously, the stowage and deployment arrangement may include a boom that is hingedly coupled with the spacecraft main body. In some implementations, the boom, in the launch configuration, may include a proximal portion hingedly coupled to an aft portion of a spacecraft sidewall, and a distal portion coupled with the reflector.

In some implementations, multiple reflectors may be disposed, in the launch configuration, above the spacecraft main body structure (i.e., forward of a forward surface of the spacecraft main body). Such a configuration of stacked reflectors is illustrated in FIG. 3, where views A, B and C illustrate, respectively, an isometric view (View A), a first elevation view (View B), and a second elevation view (View C) of a spacecraft 300.

In the illustrated implementation, four reflectors 330 are illustrated as being disposed forward of a forward surface 315 of the spacecraft main body structure 310. Each antenna reflector 330 may be disposed such that its aperture plane is substantially parallel to the forward surface 315. In the launch configuration, each antenna reflector 330 may be mechanically attached with the spacecraft main body structure 310, by way of a respective stowage and deployment arrangement 350 and by one or more coupling arrangements 340.

Referring now to FIG. 4, the spacecraft 300 is illustrated in an on orbit configuration. Views D, E and F illustrate, respectively, an isometric view (View D), a first elevation view (View E), and a second elevation view (View F) of the spacecraft 300 in the on orbit configuration. In the illustrated on orbit configuration, each reflector is disposed in a position that is substantially aft of the forward surface 315 and outboard of the spacecraft main body structure 310.

Figure 5:
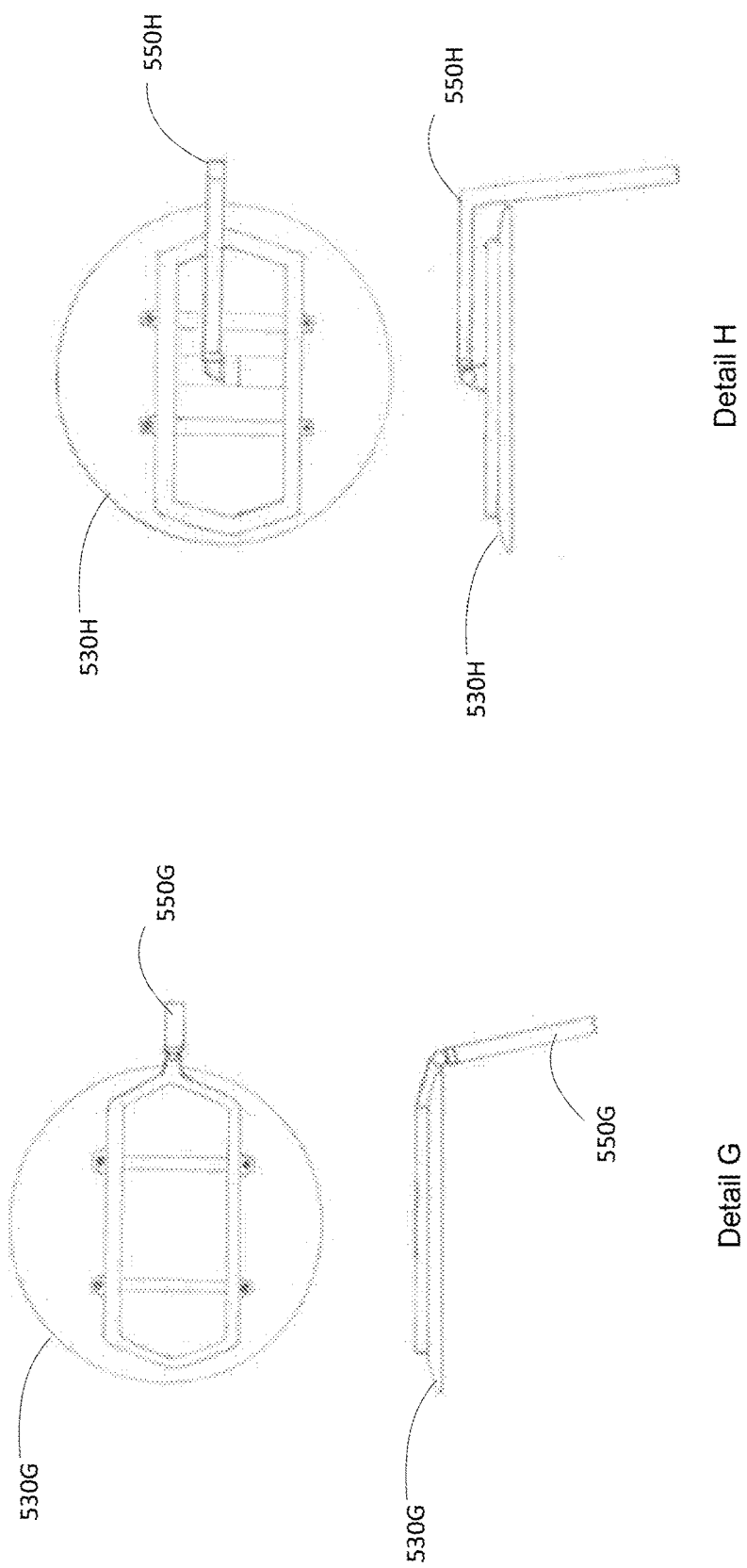
FIG. 5 illustrates stowage and deployment arrangements according to some implementations.

Referring now to FIG. 5, stowage and deployment arrangements contemplated by the present disclosure may include a distal portion proximate to a first mechanical coupling with the antenna reflector. In Detail G, it is illustrated that the distal portion 550G is proximate to a mechanical coupling near the edge of the antenna reflector 530G. In Detail H, it is illustrated that the distal portion 550H is proximate to a mechanical coupling near the center of the antenna reflector 430H, an arrangement that may be facilitated by arranging the distal portion 450H to have, as illustrated, an 'L'-shaped configuration. In either the configuration of Detail G or the configuration of Detail H, a two axis antenna positioning mechanism, or a three axis antenna positioning mechanism if desired, may be disposed between the distal portion 450G and a support structure of the antenna reflector 430G. As a result, in the on orbit configuration, beam distortion may be substantially reduced relative to configurations where the antenna positioning mechanism is disposed near the edge of the antenna reflector.

Figure 6:
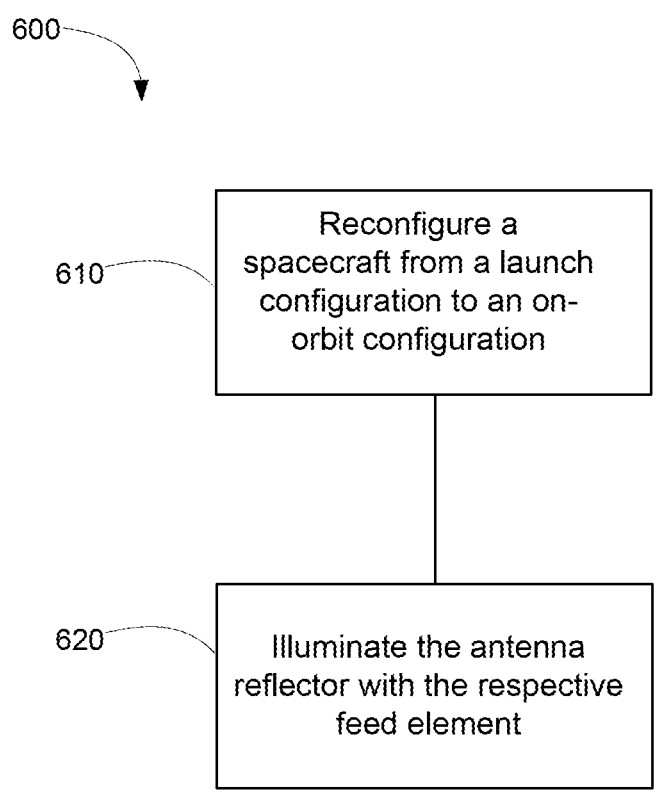
FIG. 6 illustrates a process flow diagram for reconfiguring a spacecraft from a launch configuration to an on-orbit configuration, according to an implementation.

FIG. 6 illustrates a process flow diagram for reconfiguring a spacecraft from a launch configuration to an on-orbit configuration. As described hereinabove, the spacecraft may include a structural interface adapter for mating to a launch vehicle, an aft surface disposed proximate to the structural interface adapter, a forward surface disposed opposite to the aft surface, a main body structure disposed between the aft surface and the forward surface, a stowage and deployment arrangement joined to the main body structure by a first mechanical coupling, and at least one antenna, including a rigid antenna reflector and a respective feed element. The rigid antenna reflector may have an aperture plane, the rigid antenna reflector being coupled with the main body structure by way of the stowage and deployment arrangement. The feed element is joined to the main body structure by a second mechanical coupling, different from the first mechanical coupling. In the launch configuration, the antenna reflector is disposed in a first position, undeployed, forward of the forward surface, with the aperture plane substantially parallel to the forward surface. The method 600 may start, at block 610 with reconfiguring the spacecraft from the launch configuration to the on-orbit configuration. At block 620, the antenna reflector may be illuminated with the respective feed element.

Thus, improved techniques for reconfiguring a satellite from a launch configuration to an on-orbit configuration have been described. The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. A spacecraft, comprising:
   a structural interface adapter for mating to a launch vehicle, the launch vehicle having a longitudinal axis;
   an aft surface disposed proximate to the structural interface adapter;
   a forward surface disposed opposite to the aft surface;
   a main body structure disposed between the aft surface and the forward surface;
   a stowage and deployment arrangement joined to the main body structure by a first mechanical coupling; and
   at least one antenna, including a rigid antenna reflector and a respective feed element, the respective feed element being joined to the main body structure by a second mechanical coupling, and not by the first mechanical coupling, the rigid antenna reflector being coupled with the main body structure by way of the stowage and deployment arrangement and not by the second mechanical coupling;
   the spacecraft being reconfigurable from a launch configuration to an on-orbit configuration, wherein:
   the reflector has an aperture plane and, in the launch configuration, the antenna reflector is disposed in a first position, undeployed, forward of the forward surface, with the aperture plane substantially parallel to the forward surface and orthogonal to the longitudinal axis of the launch vehicle;

the stowage and deployment arrangement repositions the antenna reflector from the first position to a second position corresponding to the on-orbit configuration; and in the second position, the antenna reflector is disposed, deployed, so as to be illuminated by the respective feed element and Earth facing from a position substantially aft of the forward surface and outboard of the main body structure.

2. The spacecraft of claim 1, wherein the stowage and deployment arrangement includes a proximal portion coupled with the first mechanical coupling and a distal portion coupled with a third mechanical coupling, the third mechanical coupling being disposed between the stowage and deployment arrangement and the rigid antenna reflector.

3. The spacecraft of claim 2, wherein the first mechanical coupling includes a hinge.

4. The spacecraft of claim 2, wherein the third mechanical coupling is near the center of the antenna reflector.

5. The spacecraft of claim 2, wherein the third mechanical coupling includes one or more of a hinged joint, an actuator, a two axis positioning mechanism, and a three axis positioning mechanism.

6. The spacecraft of claim 1, wherein the spacecraft, in the on-orbit configuration is three axis stabilized.

7. The spacecraft of claim 1, wherein, in the launch configuration, a centroid of the aperture plane is substantially aligned with the longitudinal axis.

8. The spacecraft of claim 1, wherein, in the launch configuration, the antenna reflector is mechanically attached with the spacecraft main body structure by way of a fourth mechanical coupling.

9. The spacecraft of claim 8, wherein the fourth mechanical coupling is a launch holddown device.

10. The spacecraft of claim 1, wherein the first mechanical coupling includes one or more of a hinged joint, an actuator, a two axis positioning mechanism, and a three axis positioning mechanism.

11. A method comprising:
reconfiguring a spacecraft from a launch configuration to an on-orbit configuration, wherein the spacecraft includes:
a structural interface adapter for mating to a launch vehicle, the launch vehicle having a longitudinal axis;
an aft surface;
a forward surface disposed opposite to the aft surface;
a main body structure disposed between the aft surface and the forward surface;
a stowage and deployment arrangement joined to the main body structure by a first mechanical coupling; and
at least one antenna, including a rigid antenna reflector and a respective feed element, the respective feed element being joined to the main body structure by a second mechanical coupling, and not by the first mechanical coupling, the rigid antenna reflector being coupled with the main body structure by way of the stowage and deployment arrangement and not by the second mechanical coupling;

the reflector has an aperture plane and, in the launch configuration, the antenna reflector is disposed in a first position, undeployed, forward of the forward surface, with the aperture plane substantially parallel to the forward surface and orthogonal to the longitudinal axis of the launch vehicle; and reconfiguring includes:
repositioning, with the stowage and deployment arrangement, the antenna reflector from the first position to a second position corresponding to the on-orbit configuration,
illuminating the antenna reflector with the respective feed element, the antenna reflector being disposed, deployed, in the second position so as to be Earth facing from a position substantially aft of the forward surface and outboard of the main body structure.

12. The method of claim 11, wherein the stowage and deployment arrangement includes a proximal portion coupled with the first mechanical coupling and a distal portion coupled with a third mechanical coupling, the third mechanical coupling being disposed between the stowage and deployment arrangement and the rigid antenna reflector.

13. The method of claim 12, wherein the first mechanical coupling includes a hinge.

14. The method of claim 12, wherein the third mechanical coupling is near the center of the antenna reflector.

15. The method of claim 12, wherein the third mechanical coupling includes one or more of a hinged joint, an actuator, a two axis positioning mechanism, and a three axis positioning mechanism.

16. The method of claim 11, wherein the spacecraft, in the on-orbit configuration is three axis stabilized.

17. The method of claim 11, wherein, in the launch configuration, a centroid of the aperture plane is substantially aligned with the longitudinal axis.

18. The method of claim 11, wherein, in the launch configuration, the antenna reflector is mechanically attached with the spacecraft main body structure by way of a fourth mechanical coupling.

19. The method of claim 18, wherein the fourth mechanical coupling is a launch holddown device.

20. The method of claim 11, wherein the first mechanical coupling includes one or more of a hinged joint, an actuator, a two axis positioning mechanism, and a three axis positioning mechanism.

* * * * *